US011522831B1

(12) United States Patent
Tian et al.

(10) Patent No.: US 11,522,831 B1
(45) Date of Patent: Dec. 6, 2022

(54) INCREASING EDGE DEVICE ADDRESS SPACE WHILE COMPLYING WITH A RADIO COMMUNICATION PROTOCOL

(71) Applicant: Amazon Technologies, Inc., Seattle, WA (US)

(72) Inventors: Hongbo Tian, Fremont, CA (US); Rongsheng Huang, San Jose, CA (US); Jungtao Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/219,650

(22) Filed: Mar. 31, 2021

(51) Int. Cl.
*H04L 61/5038* (2022.01)
*H04L 12/46* (2006.01)
*H04L 12/66* (2006.01)
*H04L 61/50* (2022.01)

(52) U.S. Cl.
CPC ...... *H04L 61/5038* (2022.05); *H04L 12/4641* (2013.01); *H04L 12/66* (2013.01); *H04L 61/50* (2022.05)

(58) Field of Classification Search
CPC .. H04L 61/2038; H04L 12/4641; H04L 12/66
See application file for complete search history.

(56) References Cited

U.S. PATENT DOCUMENTS

| 10,575,250 | B2 | 2/2020 | Malas et al. | |
|---|---|---|---|---|
| 2013/0310027 | A1* | 11/2013 | Foti | H04W 76/11 |
| | | | | 455/432.1 |
| 2016/0127230 | A1* | 5/2016 | Cui | H04W 40/02 |
| | | | | 370/389 |
| 2017/0332420 | A1* | 11/2017 | Cui | H04L 61/2015 |
| 2019/0104035 | A1* | 4/2019 | Cidon | H04L 41/046 |
| 2020/0107402 | A1 | 4/2020 | Di Girolamo et al. | |

* cited by examiner

*Primary Examiner* — Patrice L Winder
(74) *Attorney, Agent, or Firm* — Robert C. Kowert; Kowert, Hood, Munyon, Rankin & Goetzel, P.C.

(57) ABSTRACT

An IoT service of a provider network may be used to increase the edge device address space while complying with a radio communication protocol. This may allow a service provider to manage a much larger number of client devices that use a particular radio communication protocol that specifies a limited address space (e.g., LoRaWAN). When the IoT service receives a join request via a private gateway of the client network, the service determines, based on the private gateway ID, the client ID of the client that owns the private gateway/client network. The service may generate a unique internal ID for the edge device by combining the client ID with an assigned device ID. The internal ID identifies the edge device as an activated device of the edge network.

20 Claims, 8 Drawing Sheets

| Bit # | [31...32-N] | [31-N...0] |
|---|---|---|
| DevAddr bits | AddrPrefix | NwkAddr |

DevAddr (Device ID) according to LoRaWAN Spec (v1.1)
202

INCREASING EDGE DEVICE ADDRESS SPACE WHILE COMPLYING WITH A RADIO COMMUNICATION PROTOCOL

BACKGROUND

The Internet of Things (IoT) is a phrase given for the interconnection of computing devices scattered around the globe within the existing internet infrastructure. Clients of a remote service provider may leverage the internet-based connectivity of IoT devices (also referred to herein as edge devices) by using a service offered by the service provider. For example, temperature sensors at a client site may collect temperature values for different equipment and transmit them to the service provider for analysis, such as determining whether a machine needs servicing.

A client's network may include edge devices that communicate wirelessly using radios. A service provider may provide a service that manages edge devices for many different clients, resulting in an edge network that includes a very large number of edge devices. However, the size of the device address space that is available for assigning to edge devices may be limited based on the radio communication protocol used by the edge devices. For example, a low-power wide-area network ("LoRaWAN") protocol may specify a limited number of bits that may be used to assign a network address to each of the client edge devices, resulting in a limited number of available unique network addresses. The number of available unique network addresses may not be sufficient to meet the client demand.

BRIEF DESCRIPTION OF THE DRAWINGS

FIG. 2 is a block diagram illustrating a format of a device ID for a radio communication protocol, according to some embodiments.

Figure 1:
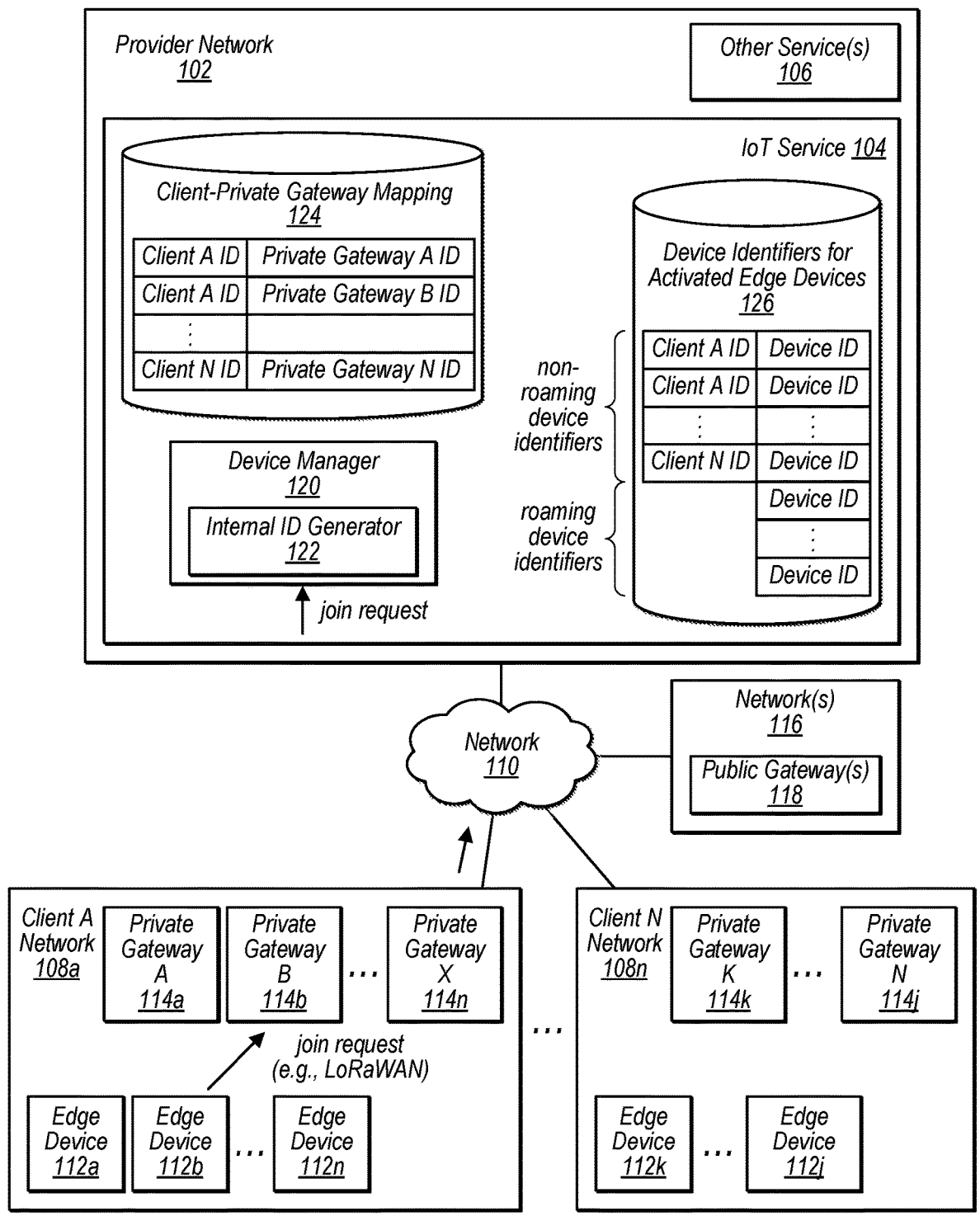
FIG. 1 is a logical block diagram illustrating a system for increasing edge device address space while complying with a radio communication protocol, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to increase edge device address space while complying with a radio communication protocol, according to some embodiments. In embodiments, increasing edge device address space while complying with a radio communication protocol (also referred to as radio protocol) may allow a service provider to manage a much larger number of client devices that use the radio communication protocol, compared to traditional techniques.

In embodiments, an IoT service of a provider network may implement at least some or all of the functionality that local onsite servers would have performed according to traditional techniques. Traditionally, a company may have specified a group of local network servers (e.g., LoRaWAN network servers) as the core network for managing edge devices that use a radio communication protocol. In embodiments, the IoT service may be responsible to authenticate/authorize edge devices' traffic as well as to manage any other aspects of the devices. Besides these responsibilities, the IoT service may also route the edge devices' traffic to destinations (e.g., a client-owned cloud application running at the provider network) or route traffic from the provider network to edge devices.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of a system for increasing edge device address space while complying with a radio communication protocol. A number of different methods and techniques to increase edge device address space while complying with a radio communication protocol are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for increasing edge device address space while complying with a radio communication protocol, according to some embodiments.

As shown, a provider network 102 includes an IoT service 104 that implements increasing edge device address space while complying with a radio communication protocol. In the example embodiment, the provider network 102 may include any number of other services 106. For example, a service 106 may implement a client-owned application that receives data (e.g., packets/payload data) from client edge devices and/or sends data to client edge devices. In various embodiments, any described functionality of the IoT service may instead be implemented by one or more of the other services 106 (e.g., storing client ID mappings, device authentication/provisioning).

In the depicted embodiment, any number of clients of the IoT service 104 may use the IoT service 104 of the provider network 102 via communication between the IoT service 104 and a remote network 108 (e.g., client A network) of the corresponding client (e.g., via a wide area network 110, such as the internet). For example, client A may own/manage the client A network 108a, which may include any number of edge devices 112 that send data to a client-owned application(s) of the provider network 102 and/or receive data from client-owned application(s) via the IoT service 104. Similarly, any number of other clients may use the IoT service 104 with any number of other edge devices in the same or similar manner as shown for the client A network 108a (e.g., using any number of edge devices and/or gateways 114 of other client network(s)).

Private gateways (e.g., 114A-X) are considered "private" because only edge devices of the client (e.g., owned/managed by client A) connect to the private gateways to communicate with the IoT service. In other words, a private gateway is reserved for client edge devices of the client network to communicate with the provider network. In embodiments, the private gateways communicate with the edge devices 112 according to a radio communication protocol that specifies a limited size of a device address space (e.g., maximum number of bits) that is available for assigning to each edge device (e.g., LoRaWAN). For example, a particular radio protocol may specify that up to 8 bits of address space are available for assignment within a message (e.g., packet, frame, etc.) that is transmitted via the radio protocol.

As shown, any number of other networks 116 may be in communication with the provider network and/or client networks via the wide-area network 110. For example, one or more of the networks 116 may include one or more public gateways 118 that allow edge devices (e.g., with roaming capability) of multiple different clients to connect to communicate with the IoT service. In some embodiments, any of the client networks 108 may have also have one or more public gateways.

In the depicted embodiment embodiments, the IoT service 104 includes a device manager 120 that may perform any number of tasks to manage any number of edge devices for any of the clients of the IoT service (e.g., device registration, provisioning, authentication, data routing). As shown, the device manager 120 includes an internal ID generator 122 that may generate unique internal IDs for different edge devices. An internal ID may be unique with respect to any other internal IDs that are generated for any other edge devices of any clients of the edge network managed by the IoT service (by combining a client's unique ID with a device ID).

The IoT service may also include a client-private gateway mapping 124 that associates/maps client IDs of clients to one or more different private gateway IDs of private gateways 114 of the clients. In embodiments, a client ID of a given client is unique with respect to any other client ID of other clients of the IoT service. Similarly, a private gateway ID of a given private gateway 114 is unique with respect to any other private gateway IDs 114 of other private gateways of clients (or at least unique with respect to other private gateway IDs of private gateways of a particular client).

As shown, the client-private gateway mapping 124 includes an entry that maps the client A ID (unique ID of client A) to the private gateway A ID (unique ID of private gateway A) of private gateway A. In embodiments, the private gateway A ID may be an identifier that identifies the hardware used to implement private gateway A and may be provided by the manufacturer of the gateway and/or may be assigned by the client or provider network. The mapping 124 also shows an entry that maps the client A ID to the private gateway B ID of private gateway B and an entry that maps the client N ID to the private gateway N ID of private gateway N. The mapping 124 may include mappings of any number of client IDs to any number of gateway IDs, depending on how many different clients/gateways are registered/used with the IoT service.

In embodiments, at least some or all of the entries in the client-private gateway mapping 124 may be maintained (added, removed, etc.) by the IoT service 104 and/or the client. For example, the device manager 120 may add entries in response to new private gateways that are registered/communicate with the IoT service. In some embodiments, user/administrator of a client may add/remove entries via an application programming interface (API) of the IoT service (e.g., using a device that includes a graphical user interface (GUI) or command line interface (CLI) to provide data to the IoT service).

In some embodiments, the device manager/internal ID generator 122 may generate may generate/assign unique internal IDs for activated edge devices and maintain these device identifiers for activated edge devices 126 (e.g., in a data store accessible to the IoT service). When the device manager 120 receives a join request (e.g., a request from the edge device 112b to join the edge network of edge devices maintained by the IoT service/device manager), the device manager determines, based on the request, a gateway ID of the private gateway that was used to transmit the request (e.g., private gateway B ID of the private gateway 114b that was used by the edge device 112b to communicate with the IoT service). For example, the private gateway 114b may add/associate private gateway B ID with the join request and send the join request to the IoT service, which can be extracted from the request by the device manager.

In various embodiments, the join request (or a re-join request) may include a unique hardware identifier for the edge device (e.g., DevEUI for LoRaWAN). As part of the activation process, the IoT service may identify the edge device based on the unique hardware identifier. The IoT service may then use the generated internal ID for any subsequent transactions (e.g., messages sent between the edge device and the IoT service).

In embodiments, the device manager 120 may determine, based on the gateway ID, a client ID of the client (e.g., based on the client-private gateway mapping). For example, the device manager may determine, based on the second entry of the mapping 124, that private gateway B ID maps/corresponds to client A ID.

The device manager 120 may then assign a device ID to the edge device (e.g., edge device 112b), wherein a predetermined number of bits of the device ID are available for assignment as a network address to the edge device in accordance with the radio communication protocol used by the edge devices/gateways (e.g., LoRaWAN). In embodiments, the device ID assigned to the edge device is unique with respect to device IDs that are assigned to a remainder of activated edge devices 112 of the client (e.g., unique among other device IDs assigned to other activated edge devices 112 of client A).

In embodiments, the device manager generates, based on the client ID (e.g., client A ID) and the assigned device ID, an internal ID for the edge device that uniquely identifies the edge device with respect to a remainder of the edge devices of the edge network managed by the IoT service on behalf of any clients. For example, the device manager may combine the client ID with the device ID (e.g., concatenating the client ID with the device ID). In some embodiments, a portion of the client ID less than the entire client ID may be combined with the device ID (e.g., 6 out of 7 bits of the client ID) to generate the internal ID. In some embodiments, a longer ID and/or different ID may be generated as the internal ID (e.g., based on the client ID and/or the device ID and/or a randomly generated ID and/or another ID unique to the client with respect to other clients). For example, the service may randomly generate a longer ID and/or a different ID and map that longer/different ID to the internal ID in a record of a mapping table for an edge device.

The device manager may then assign the generated internal ID to the edge device (e.g., edge device 112b). The internal ID may identify the edge device as an activated device of the edge network. The device manager may then send a response to the edge device that indicates the edge device has been accepted to join the edge network. In embodiments, the response includes the assigned device ID and/or the internal ID. In embodiments, messages sent from the edge device to the IoT service and/or from the IoT service to the edge device may include the assigned device ID and/or the internal ID. Upon receiving a subsequent message from the edge device, the device manager may determine, based on the received device ID and/or the internal ID, that the edge device is an activated device (e.g., based on looking up entries in the mapping 124 and/or the device identifiers for activated edge devices 126).

In embodiments, the IoT service may receive a join request from another edge device (e.g., edge device 112a) via the same private gateway or another private gateway, and perform the same/similar steps as described above to generate and assign an internal ID to the other edge device that is based on client A ID and a different assigned device ID. The IoT service may do so for any number of edge devices 112 of the client A network 108. The IoT service may perform the same/similar steps for any number of other clients/edge devices to generate and assign internal IDs for other edge devices based on other client IDs.

By combining a client's unique client ID with an assigned device ID, the available address space for uniquely identifying edge devices of an edge network can be expanded by a large number. For example, the same device ID may be assigned to an edge device of client A and another edge device of client B, but the generated internal ID for the edge device of client A will be different than the generated internal ID of the other edge device of client B because the client ID of client A is different than the client ID of client B (e.g., unique with respect to any other client IDs of other clients).

FIG. 2 is a block diagram illustrating a format of a device ID for a radio communication protocol, according to some embodiments.

In the depicted embodiment, the device ID format 202 depicts a device ID format according to a version of the LoRaWAN specification/protocol (v1.1). However, in embodiments, the same or similar format may be used for another radio communication protocol that specifies a limited address space available for assigning to edge devices of a network.

For the LoRaWAN specification (e.g., v1.0.3 and v1.1), only a part of the four bytes are used for address space for edge devices. As shown, for LoRaWAN 1.1.x, the first 7 to 25 bits of DevAddr is defined as AddrPrefix (e.g., "roaming" prefix). The remaining at most 25 bits are designated for the LoRaWAN network server (LNS) allocation. For LoRaWAN 1.0.x, the first 7 bits of DevAddr is defined as NwkID and the remaining 25 bits are used for the NwkAddr, which is allocated by the LNS.

Even using the maximum NwkAddr space (with one AddrPrefix (or NwkID)), in embodiments at most $2^{25}$ edge devices can have a unique DevAddr at the same time (approximately 32 million). In various embodiments, this number may not be enough for a network of IoT devices. However, to be compliant with LoRaWAN specification/protocol, it definition of DevAddr must be adhered to. Embodiments may provide a way to increase the device address space greatly while keeping compliant with LoRaWAN (or another radio communication protocol that specifies a limited/maximum available address space).

Figure 3A:
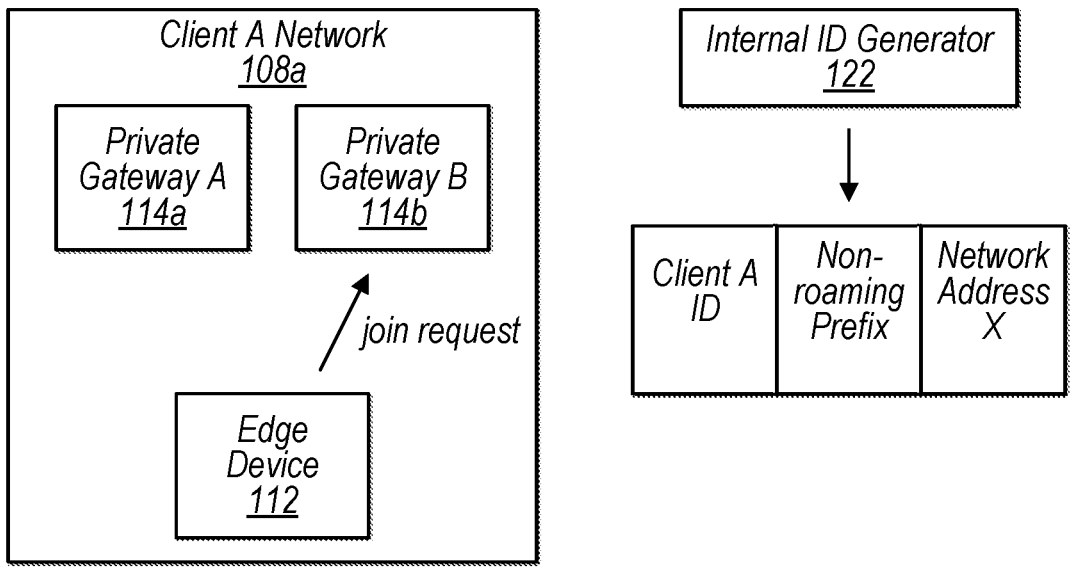
FIGS. 3A and 3B illustrate the generation of a new internal ID for an edge device after the edge device re-joins an edge network, according to some embodiments.
Figure 3B:
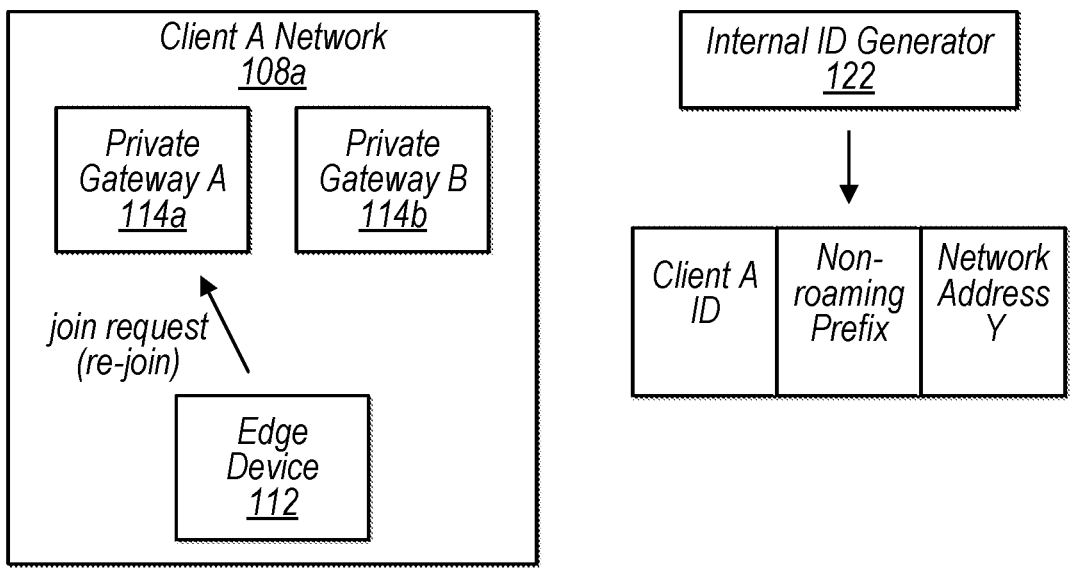

FIGS. 3A and 3B illustrate the generation of a new internal ID for an edge device after the edge device re-joins an edge network, according to some embodiments.

As depicted in FIG. 3A, an edge device (e.g., edge device 112a) sends a join request to the IoT service via private gateway B 114b. Based on the request, the internal ID generator may generate an internal ID based on client ID A and an assigned device ID. As shown, the assigned device ID may include a non-roaming prefix (e.g., a value that is not predetermined/predefined according to the specification for the radio protocol used by the edge devices) and a network address.

In embodiments, to assign the non-roaming prefix, the internal ID generator may assign a value to the non-roaming prefix that is different than any of the predetermined/predefined roaming prefixes according to the specification for the radio protocol used by the edge devices (since the edge device will be used with the private gateway(s) only). In embodiments, a different roaming prefix may be reserved for different companies/service providers that uniquely identifies the company/service provider (e.g., AddrPrefix for LoRaWAN).

FIG. 3B shows that the edge device sends another join request (e.g., a re-join request) to the IoT service via private gateway A 114a. Based on the request, the internal ID generator may generate a different internal ID based on the same client ID A and a different assigned device ID. As shown, the assigned device ID may include a non-roaming prefix and a different network address. In embodiments, the same roaming prefix and/or the network address may be assigned again.

Figure 4A:
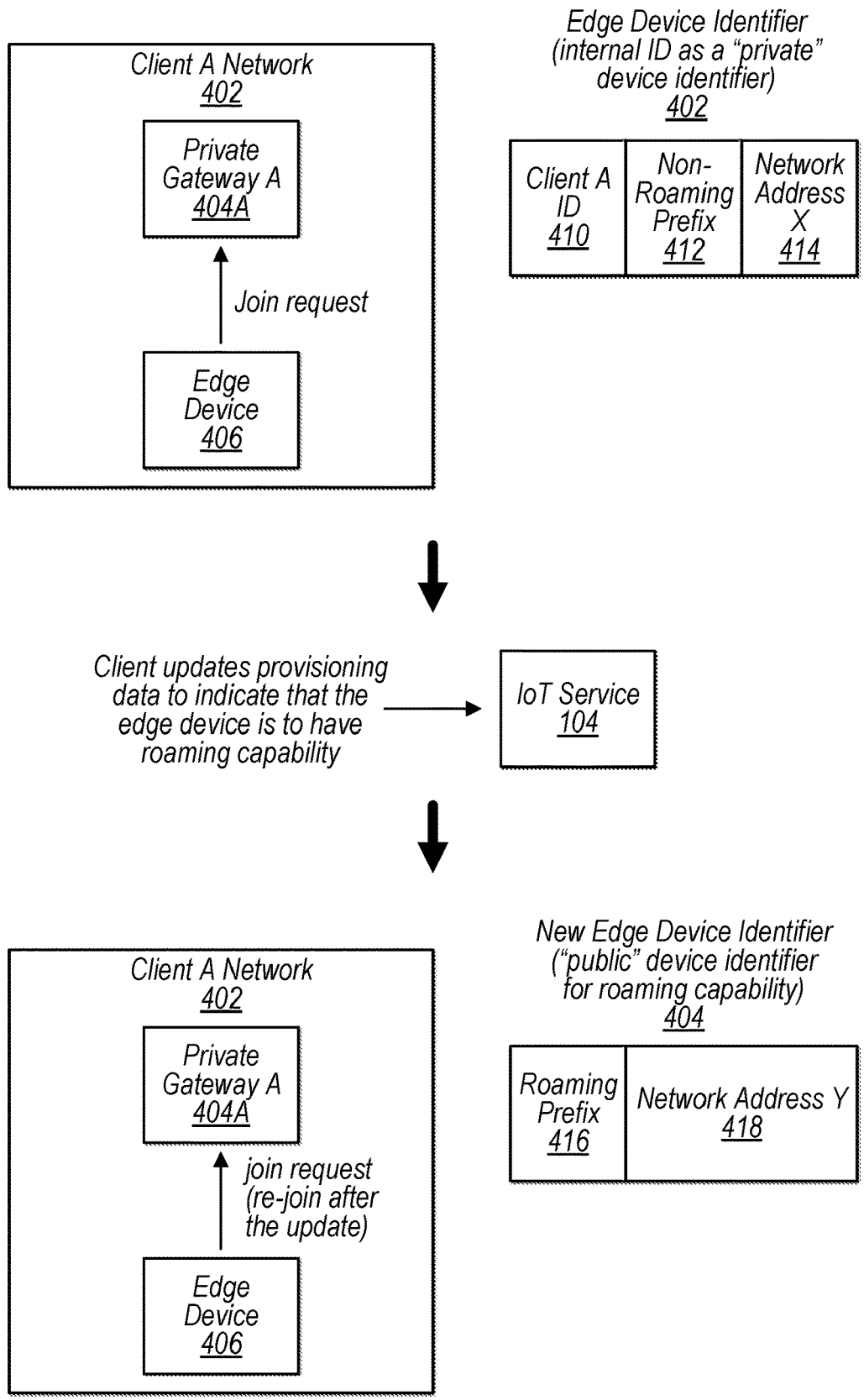
FIG. 4A illustrates the generation of a public device ID for an edge device after a client indicates that the edge device is to have roaming capability, according to some embodiments.

FIG. 4A illustrates the generation of a public device ID for an edge device after a client indicates that the edge device is to have roaming capability, according to some embodiments.

As shown, when an edge device 406 joins the edge network, the IoT service assigns an internal ID (e.g., a private device identifier) to the edge device because the edge device has been provisioned by the client as a non-roaming device. The IoT service may assign the edge device identifier 402 (internal ID) based on the client A ID, a non-roaming prefix, and a network address, as described for FIGS. 3A and 3B. After the edge device joins the network, the client may update provisioning data for the edge device to indicate that the edge device is to have roaming capability.

The edge device may send another join request at a later time (e.g., another join/re-join request after leaving the edge network) to the IoT service via the private gateway A 114a (or to another one of the private gateways). Based on the request and the updated provisioning data for the edge device, the internal ID generator may generate/assign a "public" device ID for the edge device based on the roaming prefix (a predetermined roaming prefix according to a radio protocol) and a different (or same) network address.

In embodiments, the predetermined roaming prefix may be the unique roaming prefix assigned to the provider network/IoT service. The public device ID identifies the edge device as an activated device of the edge network and may also allow the edge device to use other "public" gateways of other networks that are available for use by edge devices of multiple different clients (e.g., non-private gateways).

Figure 4B:
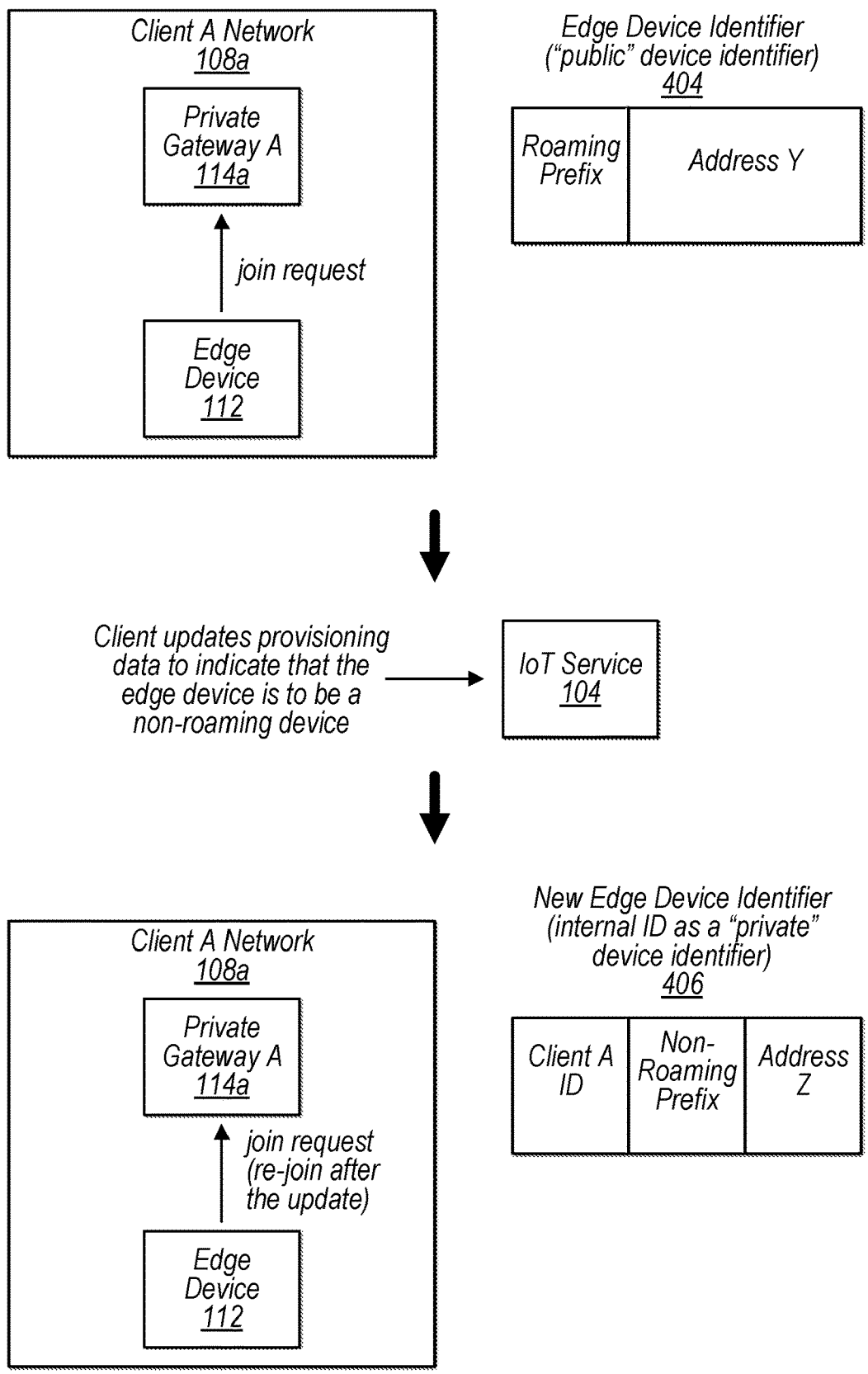
FIG. 4B illustrates the generation of a private device ID for an edge device after a client indicates that the edge device is to be a non-roaming device, according to some embodiments.

FIG. 4B illustrates the generation of a private device ID for an edge device after a client indicates that the edge device is to be a non-roaming device, according to some embodiments.

As shown, when the edge device 406 joins the edge network, the IoT service assigns an edge device identifier (e.g., a public device identifier) to the edge device because the edge device has been provisioned by the client to have roaming capability. The IoT service may assign the edge device identifier 404 based on the client A ID, a roaming prefix, and a network address as described for FIG. 4A. After the edge device joins the network, the client may update provisioning data for the edge device to indicate that the edge device is to be a non-roaming device (e.g., not have roaming capability).

The edge device may send another join request at a later time (e.g., another join/re-join request after leaving the edge network) to the IoT service via the private gateway A 114a (or to another one of the private gateways). Based on the request and the updated provisioning data for the edge device, the internal ID generator may generate/assign an internal ID for the edge device based on the client A ID, a non-roaming prefix, and a different (or same) network address, in the same/similar way as described above to generate an internal ID (e.g., generating the internal ID by combining the client ID with the device identifier (non-roaming prefix/network address)). The internal ID uniquely identifies the edge device as an activated device of the edge network.

Figure 5:
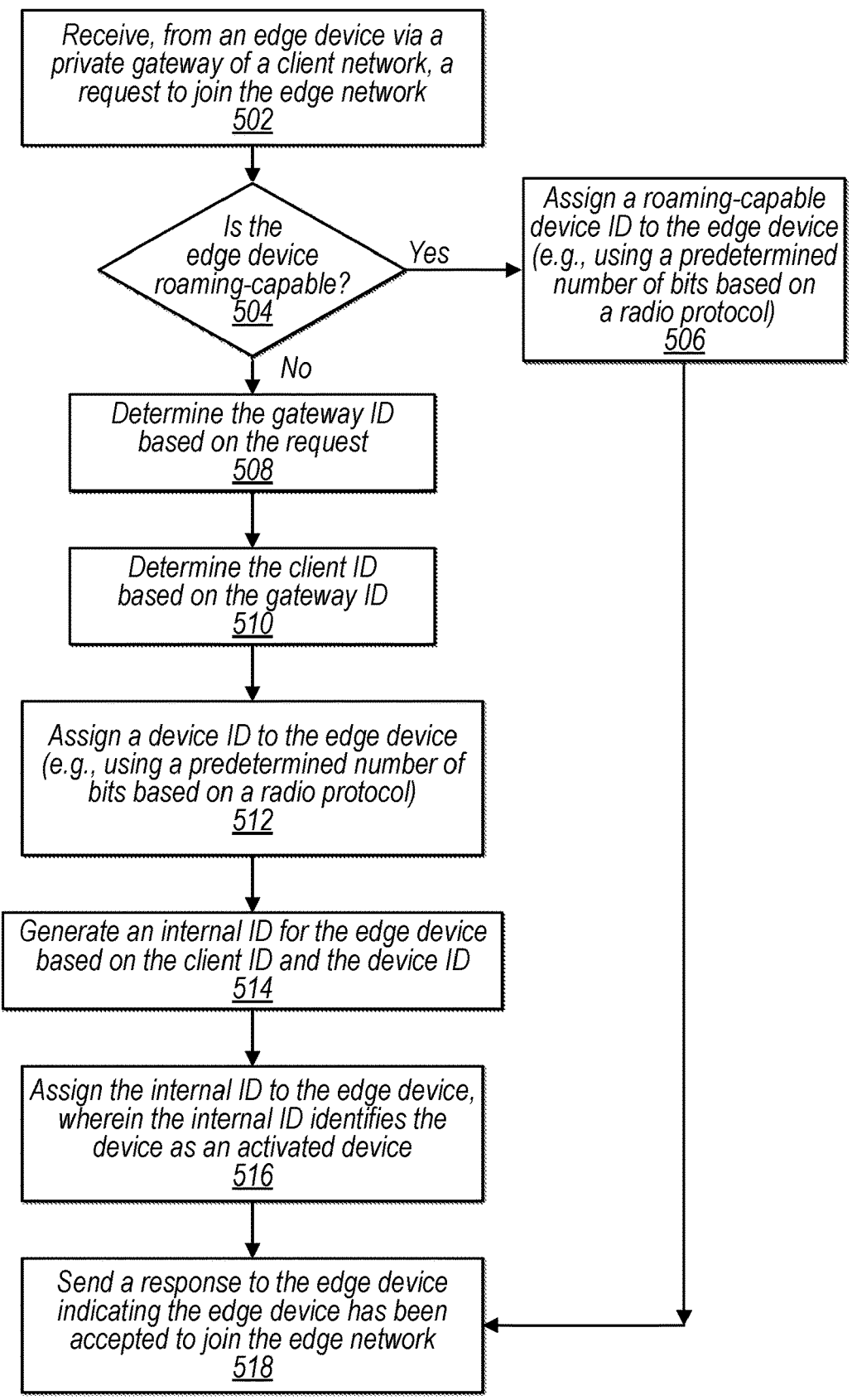
FIG. 5 is a high-level flowchart illustrating various methods and techniques to increase edge device address space while complying with a radio communication protocol, according to some embodiments.

FIG. 5 is a high-level flowchart illustrating various methods and techniques to increase edge device address space while complying with a radio communication protocol, according to some embodiments. In various embodiments, any of the functionality described for any portions of the flowcharts 5-6 may be performed by any of the components of FIGS. 1-4 and/or 7.

Figure 6:
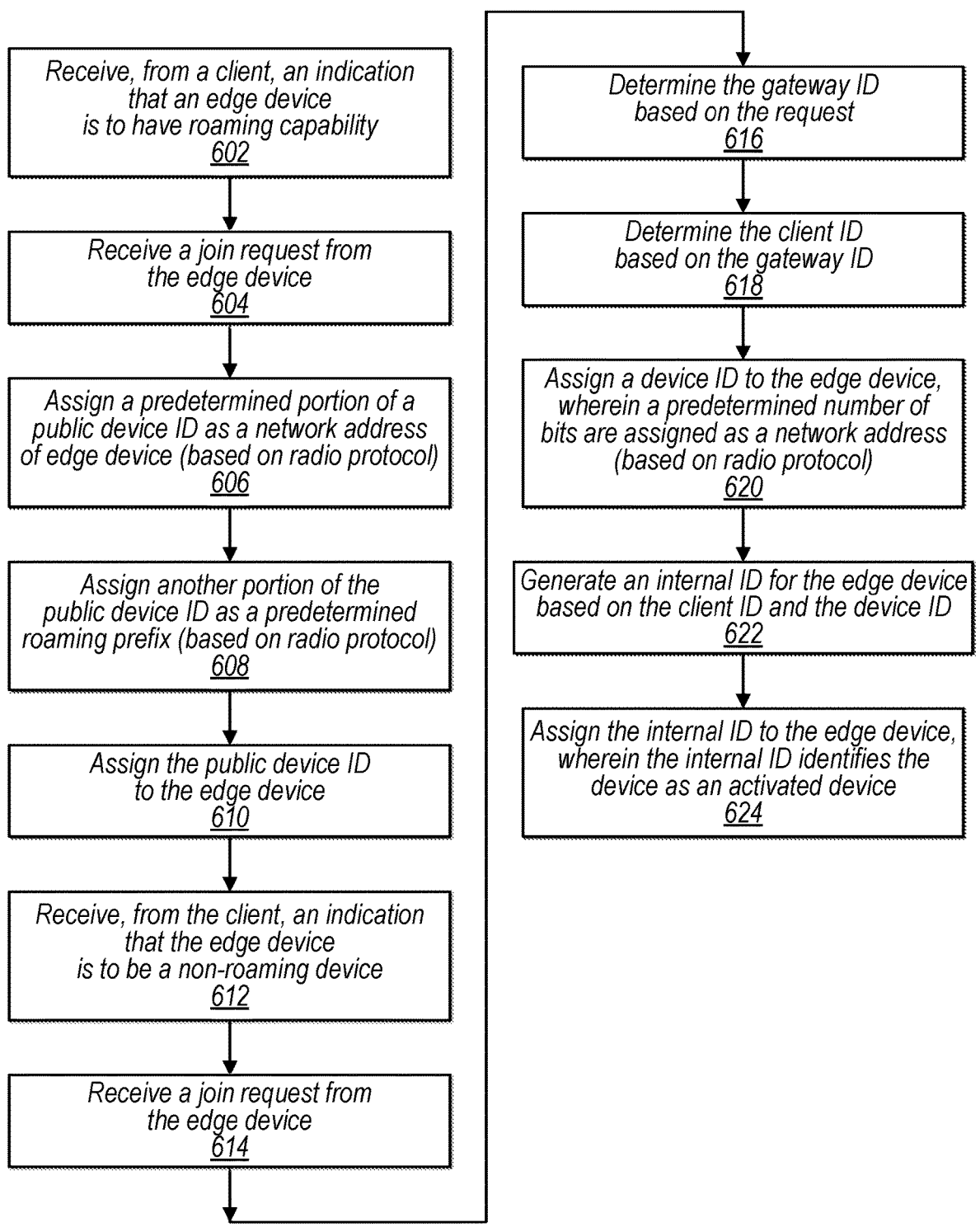
FIG. 6 is a high-level flowchart illustrating various methods and techniques to assign device identifiers to an edge device in order to add or remove roaming capability, according to some embodiments.

These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, any of the techniques may be implemented by one or more services of a provider network and/or a local service/application of a client network.

At block 502, the IoT service receives, from an edge device via a private gateway of a client network, a request to join the network managed by the IoT service. At block 504, the IoT service determines whether the edge device is roaming-capable. If so, then at block 506, the service assigns a roaming-capable device ID (e.g., public device ID) to the edge device. The service may assign the public device ID using a predetermined number of bits based on a radio protocol, such as LoRaWAN). In embodiments, the service may send a response to the edge device indicating that the edge device has been accepted to join the edge network and/or indicating the assigned roaming-capable device ID.

Returning to block 504, if the IoT service determines that the edge device is not roaming-capable (e.g., a non-roaming device), then at block 508 the service determines the gateway ID of the private gateway based on the request to join. At block 510, the IoT service determines the client ID based on the gateway ID.

At block 512, the IoT service assigns a device ID to the edge device (a predetermined number of bits may be available for assignment as a network address based on the radio protocol used). The device ID may include one or more other portions, such as a non-roaming prefix). At block 514, the IoT service generates an internal ID for the edge device based on the client ID and the device ID. At block 516, the IoT service assigns the internal ID to the edge device. The internal ID may identify the device as an activated device. At block 518, the IoT service sends a response to the edge device indicating that the edge device has been accepted to join the edge network and/or indicating the assigned device ID.

FIG. 6 is a high-level flowchart illustrating various methods and techniques to assign device identifiers to an edge device in order to add or remove roaming capability, according to some embodiments.

At block 602, the IoT service receives, from for a client, an indication that an edge device is to have roaming capability (e.g., from a user via an application programming interface of the service). At block 604, the IoT service receives a join request from the edge device. At block 606, the IoT service assigns a predetermined portion of a public device ID as a network address of the edge device. At block 608, the IoT service assigns another portion of the public device ID as a predetermined/predefined roaming prefix (e.g., the prefix assigned to the IoT service).

At block 610, the IoT service may assign the public device ID to the edge device. At block 612, the IoT service receives, from capability client, an indication that the edge device is to be a non-roaming device. At block 614, the IoT service receives another join request (e.g., a re-join request) from the edge device. At block 616, the IoT service determines the gateway ID of the private gateway based on the request (based at least on the updated provisioning data indicating the device is a non-roaming device). At block 618, the IoT service determines the client ID based on the gateway ID.

At block 620, the IoT service assigns a device ID to the edge device (a predetermined number of bits may be available for assignment as a network address based on the radio protocol used). The device ID may include one or more other portions, such as a non-roaming prefix). At block 622, the IoT service generates an internal ID for the edge device based on the client ID and the device ID. At block 624, the IoT service assigns the internal ID to the edge device. The internal ID may identify the device as an activated device. In embodiments, the IoT service sends a response to the edge device indicating that the edge device has been accepted to join the edge network and/or indicating the assigned device ID.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of the IoT service and any other components that implement the techniques described herein). The various methods as illustrated in the figures and described herein represent example embodiments of methods. The order of any method may be changed, and various elements may be added, reordered, combined, omitted, modified, etc.

Figure 7:
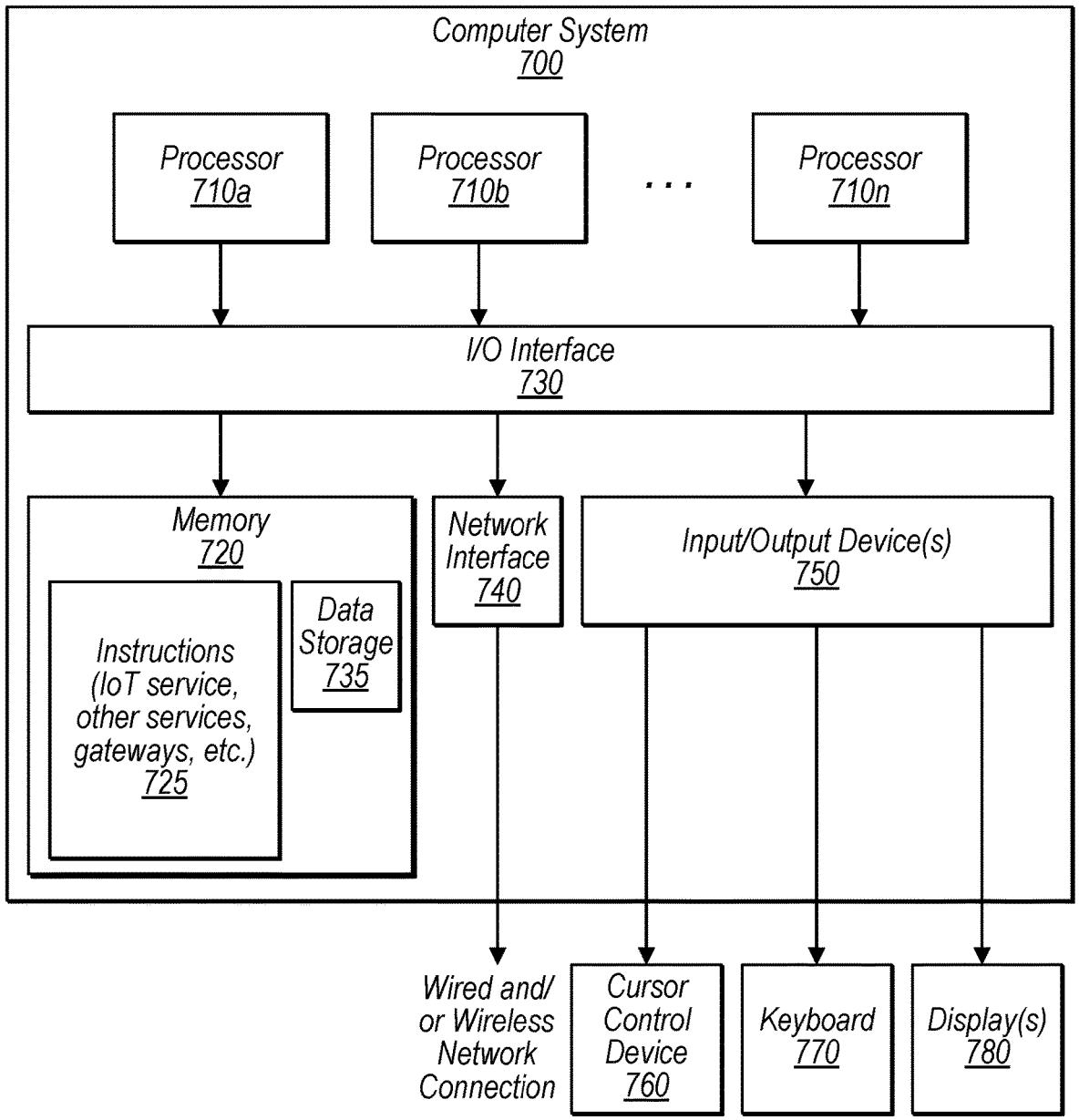
FIG. 7 is a block diagram illustrating an example computing system, according to some embodiments.

Embodiments to implement increasing edge device address space while complying with a radio communication protocol, which may interact with various other systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., IoT service and any other components) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., mappings, device identifiers, messages, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors and one or more memories, wherein the one or more memories have stored thereon instructions, which when executed by the one or more processors, cause the one or more processors to implement an Internet of Things (IoT) service that manages an edge network of edge devices for a plurality of clients of a provider network, wherein the IoT service is configured to, for a given client:
receive, from an edge device via a private gateway of a remote client network of the client, a request to join the edge network, wherein the private gateway is reserved for edge devices of the client network to communicate with the provider network, and wherein the private gateway communicates with the edge device according to a radio communication protocol;
determine, based on the request, a gateway identifier (ID) of the private gateway;
determine, based on the gateway ID, a client ID of the client;
assign a device ID to the edge device, wherein a predetermined number of bits of the device ID are available for assignment as a network address to the edge device in accordance with the radio communication protocol, and wherein the device ID assigned to the edge device is unique with respect to device IDs assigned to a remainder of the edge devices of the client;
generate, based on the client ID and the device ID, an internal ID for the edge device that uniquely identifies the edge device with respect to a remainder of the edge devices of the edge network; and
assign the internal ID to the edge device, wherein the internal ID identifies the edge device as an activated device of the edge network; and
send a response to the edge device, wherein the response indicates that the edge device has been accepted to join the edge network, and wherein the response comprises the device ID.

2. The system as recited in claim 1, wherein to generate the internal ID for the edge device, the IoT service is further configured to:
combine the client ID with the device ID.

3. The system as recited in claim 2, wherein the IoT service is further configured to:
receive, from another edge device via another private gateway of a remote client network of another client, another request to join the edge network, wherein the other private gateway is reserved for edge devices of the other client network to communicate with the provider network, and wherein the other private gateway communicates with the other edge device according to the radio communication protocol;
determine, based on the other request, another gateway ID of the other private gateway;
determine, based on the other gateway ID, another client ID of the other client;
assign another device ID to the other edge device, wherein a predetermined number of bits of the other device ID are available for assignment as a network address to the other edge device in accordance with the radio communication protocol, and wherein the other device ID assigned to the other edge device is unique with respect to device IDs assigned to a remainder of the edge devices of the other client, and wherein the other device ID matches the device ID;
generate, based on the other client ID and the other device ID, another internal ID for the other edge device that uniquely identifies the other edge device with respect to another remainder of the edge devices of the edge network; and
assign the other internal ID to the other edge device, wherein the other internal ID identifies the other edge device as an activated device of the edge network.

4. The system as recited in claim 1, wherein the IoT service is further configured to:
in response to the request to join, determine that a public device ID is to be assigned to the edge device;
in response to the determination that a public device ID is to be assigned to the edge device:
assign a predetermined number of bits of the public device ID available for assignment as the network address to the edge device in accordance with the radio communication protocol;
assign another number of bits of the public device ID as a predetermined ID for the provider network in accordance with the radio communication protocol; and
assign the public device ID to the edge device, wherein the public device ID identifies the edge device as an activated device of the edge network.

5. The system as recited in claim 1, wherein the IoT service is further configured to:
receive, from another edge device via another private gateway of the remote client network of the client, another request to join the edge network, wherein the other private gateway is reserved for the edge devices of the client network to communicate with the provider network, and wherein the other private gateway communicates with the other edge device according to the radio communication protocol;
determine, based on the other request, another gateway ID of the other private gateway;
determine, based on the other gateway ID, the client ID of the client;
assign another device ID to the other edge device, wherein a predetermined number of bits of the other device ID are available for assignment as a network address to the other edge device in accordance with the radio communication protocol, and wherein the other device ID assigned to the other edge device is unique with respect to device IDs assigned to another remainder of the edge devices of the client;
generate, based on the client ID and the device ID, another internal ID for the other edge device that uniquely identifies the other edge device with respect to another remainder of the edge devices of the edge network; and
assign the other internal ID to the other edge device, wherein the other internal ID identifies the other edge device as an activated device of the edge network.

6. A method, comprising:
performing, by one or more computing devices of a provider network:
receiving, by an Internet of Things (IoT) service from an edge device via a private gateway of a remote client network of a client, a request to join an edge network of edge devices, wherein the private gateway is reserved for edge devices of the client network to communicate with the provider network, and wherein the private gateway communicates with the edge device according to a radio communication protocol, and wherein the IoT service manages the edge network for a plurality of clients of the provider network;
determining, based on the request, a gateway identifier (ID) of the private gateway;
determining, based on the gateway ID, a client ID of the client;
assigning a device ID to the edge device, wherein a predetermined portion of the device ID is available for assignment as a network address to the edge device in accordance with the radio communication protocol;
generating, based on the client ID and the device ID, an internal ID for the edge device that uniquely identifies the edge device with respect to a remainder of the edge devices of the edge network; and
assigning the internal ID to the edge device, wherein the internal ID identifies the edge device as an activated device of the edge network.

7. The method as recited in claim 6, wherein generating the internal ID for the edge device comprises:
combining the client ID with the device ID.

8. The method as recited in claim 6, further comprising:
receiving, from another edge device via another private gateway of a remote client network of another client, another request to join the edge network, wherein the other private gateway is reserved for edge devices of the other client network to communicate with the provider network, and wherein the other private gateway communicates with the other edge device according to the radio communication protocol;
determining, based on the other request, another gateway ID of the other private gateway;
determining, based on the other gateway ID, another client ID of the other client;
assigning another device ID to the other edge device, wherein a predetermined portion of the other device ID is available for assignment as a network address to the other edge device in accordance with the radio communication protocol;

generating, based on the other client ID and the other device ID, another internal ID for the other edge device that uniquely identifies the other edge device with respect to another remainder of the edge devices of the edge network; and assigning the other internal ID to the other edge device, wherein the other internal ID identifies the other edge device as an activated device of the edge network.

9. The method as recited in claim 6, further comprising:
receiving, from another edge device via another private gateway of the remote client network of the client, another request to join the edge network, wherein the other private gateway is reserved for the edge devices of the client network to communicate with the provider network, and wherein the other private gateway communicates with the other edge device according to the radio communication protocol;

determining, based on the other request, another gateway ID of the other private gateway;

determining, based on the other gateway ID, the client ID of the client;

assigning another device ID to the other edge device, wherein a predetermined portion of the other device ID is available for assignment as a network address to the other edge device in accordance with the radio communication protocol;

generating, based on the client ID and the device ID, another internal ID for the other edge device that uniquely identifies the other edge device with respect to another remainder of the edge devices of the edge network; and assigning the other internal ID to the other edge device, wherein the other internal ID identifies the other edge device as an activated device of the edge network.

10. The method as recited in claim 6, wherein the radio communication protocol is a low-power wide-area network (LoRaWAN) protocol.

11. The method as recited in claim 6, further comprising:
receiving, by the IoT service from the edge device via the private gateway of the remote client network, another request to join the edge network;

determining, based on the other request, the gateway ID of the private gateway;

determining, based on the gateway ID, the client ID of the client;

assigning a different device ID to the edge device, wherein a predetermined portion of the different device ID is available for assignment to the edge device in accordance with the radio communication protocol;

generating, based on the client ID and the different device ID, another internal ID for the edge device that uniquely identifies the edge device with respect to the remainder of the edge devices of the edge network; and assigning the other internal ID to the edge device, wherein the other internal ID identifies the edge device as an activated device of the edge network.

12. The method as recited in claim 6, wherein the request to join comprises a unique hardware identifier for the edge device.

13. The method as recited in claim 6, wherein the device ID comprises another portion that is available for assignment as a roaming prefix from among a plurality of available roaming prefixes in accordance with the radio communication protocol, and wherein assigning the device ID to the edge device comprises:
assigning a value to the other portion that is different than the plurality of available roaming prefixes.

14. The method as recited in claim 6, further comprising:
receiving, from the client, an indication that the edge device is to have roaming capability;

subsequent to receiving the indication from the client, receiving another join request from the edge device;

in response to the other join request:
assigning a predetermined portion of a public device ID available for assignment as a network address of the edge device in accordance with the radio communication protocol;

assigning another portion of the public device ID as a predetermined roaming prefix in accordance with the radio communication protocol; and assigning the public device ID to the edge device, wherein the public device ID identifies the edge device as an activated device of the edge network.

15. One or more non-transitory computer-accessible storage media storing program instructions that when executed on or across one or more processors cause the one or more processors to:
receive, by an Internet of Things (IoT) service from an edge device via a private gateway of a remote client network of a client, a request to join an edge network of edge devices, wherein the private gateway is reserved for client edge devices of the client network to communicate with the provider network, and wherein the private gateway communicates with the edge device according to a radio communication protocol, and wherein the IoT service manages the edge network for a plurality of clients of the provider network;

determine, based on the request, a gateway identifier (ID) of the private gateway;

determine, based on the gateway ID, a client ID of the client;

assign a device ID to the edge device, wherein a predetermined portion of the device ID is available for assignment as a network address to the edge device in accordance with the radio communication protocol;

generate, based on the client ID and the device ID, an internal ID for the edge device that uniquely identifies the edge device with respect to a remainder of the edge devices of the edge network; and assign the internal ID to the edge device, wherein the internal ID identifies the edge device as an activated device of the edge network.

16. The one or more storage media as recited in claim 15, wherein to generate the internal ID for the edge device, the program instructions when executed on or across the one or more processors further cause the one or more processors to:
combine the client ID with the device ID.

17. The one or more storage media as recited in claim 15, wherein the program instructions when executed on or across the one or more processors further cause the one or more processors to:
receive, from another edge device via another private gateway of a remote client network of another client, another request to join the edge network, wherein the other private gateway is reserved for edge devices of the other client network to communicate with the provider network, and wherein the other private gateway communicates with the other edge device according to the radio communication protocol;

determine, based on the other request, another gateway ID of the other private gateway;

determine, based on the other gateway ID, another client ID of the other client;

assign another device ID to the other edge device, wherein a predetermined portion of the other device ID is available for assignment as a network address to the other edge device in accordance with the radio communication protocol;

generate, based on the other client ID and the other device ID, another internal ID for the other edge device that uniquely identifies the other edge device with respect to another remainder of the edge devices of the edge network; and assign the other internal ID to the other edge device, wherein the other internal ID identifies the other edge device as an activated device of the edge network.

18. The one or more storage media as recited in claim 15, wherein the program instructions when executed on or across the one or more processors further cause the one or more processors to:

receive, from another edge device via another private gateway of the remote client network of the client, another request to join the edge network, wherein the other private gateway is reserved for the edge devices of the client network to communicate with the provider network, and wherein the other private gateway communicates with the other edge device according to the radio communication protocol;

determine, based on the other request, another gateway ID of the other private gateway;

determine, based on the other gateway ID, the client ID of the client;

assign another device ID to the other edge device, wherein a predetermined portion of the other device ID is available for assignment as a network address to the other edge device in accordance with the radio communication protocol;

generate, based on the client ID and the device ID, another internal ID for the other edge device that uniquely identifies the other edge device with respect to another remainder of the edge devices of the edge network; and assign the other internal ID to the other edge device, wherein the other internal ID identifies the other edge device as an activated device of the edge network.

19. The one or more storage media as recited in claim 15, wherein the radio communication protocol is a low-power wide-area network (LoRaWAN) protocol.

20. The one or more storage media as recited in claim 15, wherein the program instructions when executed on or across the one or more processors further cause the one or more processors to:

receive, from the client, an indication that the edge device is to be a non-roaming device;

subsequent to receiving the indication from the client, receiving another join request from the edge device;

in response to the other join request:

determine, based on the other join request, the gateway ID of the private gateway;

determine, based on the gateway ID, the client ID of the client;

assign another device ID to the edge device, wherein a predetermined portion of the other device ID is available for assignment as a network address to the edge device in accordance with the radio communication protocol;

generate, based on the client ID and the other device ID, an internal ID for the edge device that uniquely identifies the edge device with respect to the remainder of the edge devices of the edge network; and assign the internal ID to the edge device, wherein the internal ID identifies the edge device as an activated device of the edge network.

\* \* \* \* \*